US012812515B2

(12) United States Patent
Suh

(10) Patent No.: US 12,812,515 B2
(45) Date of Patent: Nov. 24, 2026

(54) METHOD AND DEVICE FOR COMMUNICATING IN SATELLITE RAN AND CELLULAR WIRELESS RAN COMMUNICATION ENVIRONMENT

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 18/443,929

(22) Filed: Feb. 16, 2024

(65) Prior Publication Data

US 2024/0284315 A1 Aug. 22, 2024

(30) Foreign Application Priority Data

Feb. 17, 2023 (KR) ........................ 10-2023-0021563

(51) Int. Cl.
*H04W 48/16* (2009.01)
*H04W 60/00* (2009.01)
(Continued)

(52) U.S. Cl.
CPC ........... *H04W 48/16* (2013.01); *H04W 60/00* (2013.01); *H04W 84/06* (2013.01); *H04W 88/06* (2013.01)

(58) Field of Classification Search
None
See application file for complete search history.

(56) References Cited

U.S. PATENT DOCUMENTS 12,063,711 B2 * 8/2024 Tiwari .................. H04W 12/03
12,120,575 B2 * 10/2024 Rasanen ................ H04W 4/20
(Continued)

FOREIGN PATENT DOCUMENTS

CN 112996102 A 6/2021
WO 2022/154599 A1 7/2022

OTHER PUBLICATIONS

3GPP; 3rd Generation Partnership Project; Technical Specification Group Services and System Aspects; Study on architecture aspects for using satellite access in 5G; (Release 17); 3GPP TR 23.737; V17.2.0; (Mar. 2021); Valbonne, France; Mar. 31, 2021.
(Continued)

*Primary Examiner* — Phirin Sam
(74) *Attorney, Agent, or Firm* — Jefferson IP Law, LLP

(57) ABSTRACT

The disclosure relates to a 5G or 6G communication system for supporting a higher data transmission rate. According to an embodiment, a method by a user equipment (UE) communicating with a satellite radio access network (RAN) and a cellular network may comprise transmitting, to an access and mobility management function (AMF), a registration request message including information about the UE's supporting capability for each of a first timer for the satellite RAN and a second timer for the cellular network, an access cell type, and location information, receiving, from the AMF, a registration accept message including supporting information about a network related to the first timer and the second timer and mobility management information, and determining at least one timer to be used by the UE of the first timer and the second timer based on the supporting information about the network and the mobility management information.

11 Claims, 6 Drawing Sheets

(51) Int. Cl.
*H04W 84/06* (2009.01)
*H04W 88/06* (2009.01)

(56) References Cited

U.S. PATENT DOCUMENTS

| | | | | |
|---|---|---|---|---|
| 2011/0069664 | A1* | 3/2011 | Yin | H04W 60/00 370/328 |
| 2015/0282118 | A1* | 10/2015 | Vaidya | H04W 68/04 455/458 |
| 2019/0297593 | A1* | 9/2019 | Niemi | H04W 8/02 |
| 2020/0204982 | A1* | 6/2020 | Ruvalcaba | H04W 8/183 |
| 2020/0314955 | A1* | 10/2020 | Velev | H04W 76/11 |
| 2020/0396000 | A1 | 12/2020 | Ryu et al. | |
| 2021/0105065 | A1* | 4/2021 | Ravishankar | H04W 64/00 |
| 2021/0143897 | A1* | 5/2021 | Edge | H04B 7/18513 |
| 2022/0151014 | A1* | 5/2022 | Kedalagudde | H04W 76/19 |
| 2022/0232463 | A1* | 7/2022 | Sadique | H04W 48/18 |
| 2022/0232464 | A1* | 7/2022 | Matolia | H04B 7/18554 |
| 2022/0386401 | A1* | 12/2022 | Qiao | H04W 28/0215 |
| 2023/0045704 | A1 | 2/2023 | Awoniyi-Oteri et al. | |
| 2023/0156042 | A1* | 5/2023 | Zhou | H04W 12/122 726/1 |
| 2023/0217298 | A1* | 7/2023 | Chae | H04L 47/2441 370/328 |
| 2024/0121744 | A1 | 4/2024 | Suh | |
| 2024/0236833 | A1* | 7/2024 | Roy | H04W 84/06 |

OTHER PUBLICATIONS

3GPP; 3rd Generation Partnership Project; Technical Specification Group Services and System Aspects; Study on Integration of satellite components in the 5G architecture; Phase 2 (Release 18); 3GPP TR 23.700-28; V18.0.0; (Dec. 2022); Valbonne, France; Dec. 21, 2022.

International Search Report with Written Opinion dated May 24, 2024; International Appln. No. PCT/KR2024/095335.

* cited by examiner

METHOD AND DEVICE FOR COMMUNICATING IN SATELLITE RAN AND CELLULAR WIRELESS RAN COMMUNICATION ENVIRONMENT

CROSS-REFERENCE TO RELATED APPLICATION(S)

This application is based on and claims priority under 35 U.S.C. § 119(a) of a Korean patent application number 10-2023-0021563, filed on Feb. 17, 2023, in the Korean Intellectual Property Office, the disclosure of which is incorporated by reference herein in its entirety.

BACKGROUND

1. Field

The disclosure relates to a device and method for supporting mobility of a user equipment (UE) when communicating using a cellular network and a satellite radio access network (RAN) in a wireless communication system. More particularly, the disclosure relates to a method and device for controlling a UE communicating with a satellite RAN or a cellular network, and an access and mobility management function (AMF).

2. Description of Related Art

Fifth generation (5G) mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, sixth generation (6G) mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive multiple-input multiple-output (MIMO) for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, new radio (NR) UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step Random Access Channel (RACH) for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

When a UE uses a satellite communication, cellular network in a mobility context, the coverage of a satellite covers various coverages depending on the type of the satellite unlike general 5G new radio (NR) small cells. Accordingly, a need arises for a method for managing the mobility of the UE, the state of the UE, and UE registration considering the mobility of the UE.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for supporting the mobility of a user equipment (UE) when using a satellite communication, fifth generation (5G) cellular network in a wireless communication system.

Additional aspects will be set forth in part in the description which follows and, in part, will be apparent from the description, or may be learned by practice of the presented embodiments.

In accordance with an aspect of a disclosure, a method performed by a UE communicating with a satellite radio access network (RAN) and a cellular network is provided. The method includes transmitting, to an access and mobility management function (AMF), a registration request message including information about the UE's supporting capability for each of a first timer for the satellite RAN and a second timer for the cellular network, an access cell type, and location information, receiving, from the AMF, a registration accept message including supporting information about a network related to the first timer and the second timer and mobility management information, determining at least one timer to be used by the UE of the first timer and the second timer based on the supporting information about the network and the mobility management information.

In accordance with another aspect of a disclosure, a method performed by an AMF communicating with a RAN and a cellular network is provided. The method includes receiving, from a UE, a registration request message including information about the UE's supporting capability for each of a first timer for the satellite RAN and a second timer for the cellular network, an access cell type, and location information, determining whether a network accessed by the UE is the satellite RAN or the cellular network, based on the access cell type and the location information, transmitting, to the UE, a registration accept message including supporting information about a network related to the first timer and the second timer and mobility management information, based on a result of the determination.

In accordance with another aspect of a disclosure, a UE communicating with a RAN and a cellular network is provided. The UE includes a transceiver, memory storing one or more computer programs, and one or more processors communicatively coupled to the transceiver and the memory. The one or more computer programs include computer-executable instructions that, when executed by the one or more processors, cause the UE to transmit, to an AMF, a registration request message including information about the UE's supporting capability for each of a first timer for the satellite RAN and a second timer for the cellular network, an access cell type, and location information, receive, from the AMF, a registration accept message including supporting information about a network related to the first timer and the second timer and mobility management information, determine at least one timer to be used by the UE of the first timer and the second timer based on the supporting information about the network and the mobility management information.

In accordance with another aspect of the disclosure, an AMF communicating with a RAN and a cellular network is provided. The AMF includes a transceiver, memory storing one or more computer programs, and one or more processors communicatively coupled to the transceiver and the memory. The one or more computer programs include computer-executable instructions that, when executed by the one or more processors, cause the AMF to receive, from a UE, a registration request message including information about the UE's supporting capability for each of a first timer for the satellite RAN and a second timer for the cellular network, an access cell type, and location information, determine whether a network accessed by the UE is the satellite RAN or the cellular network, based on the access cell type and the location information, transmit, to the UE, a registration accept message including supporting information about a network related to the first timer and the second timer and mobility management information, based on a result of the determination.

By the method and device according to an embodiment, when a UE receiving a service by a cellular RAN and a satellite RAN having broader coverage than the 5G cell or long term evolution (LTE) cell moves to a different position, the UE may successfully perform a state transition of the UE and perform mobility management in relation to mobility.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
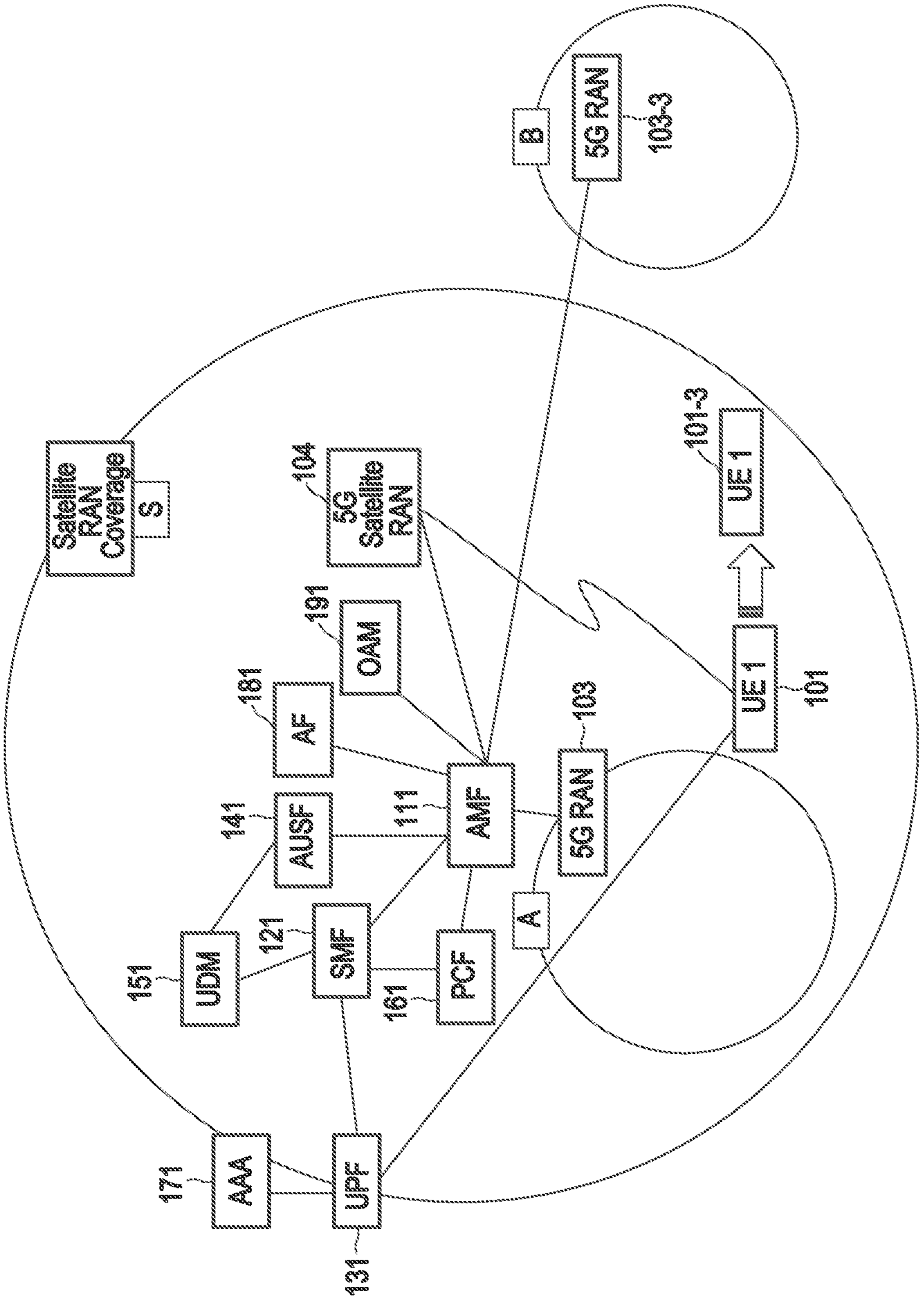
FIG. 1A illustrates a user equipment (UE) and a network environment for performing wireless communication in an environment where fifth generation (5G) communication and satellite communication are supported according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more central processing units (CPUs) in a device or secure multimedia card. According to embodiments, a " . . . unit" may include one or more processors.

As used herein, terms for identifying access nodes, terms denoting network entities, terms denoting messages, terms denoting inter-network entity interfaces, and terms denoting various pieces of identification (ID) information are provided as an example for ease of description. Thus, the disclosure is not limited to the terms, and the terms may be replaced with other terms denoting objects with equivalent technical meanings.

For ease of description, the terms and names defined in the 3rd generation partnership project long term evolution (3GPP LTE) and/or 3GPP NR standards, or terms and names modified based thereupon may be used herein. However, the disclosure is not limited by such terms and names and may be likewise applicable to systems conforming to other standards. According to the disclosure, the base station may be an entity allocating a resource to the UE and may be at least one of a gNode B(gNB), eNode B(eNB), Node B, BS, radio access network (RAN), next generation-RAN (NG-RAN), satellite-RAN, base station controller, or node on network. The base station may provide network access to UE(s) in an LTE system or NR system. For convenience of description, eNB and gNB may be used interchangeably. In other words, the base station described as an eNB may represent a gNB. The term UE herein may refer to mobile phones, narrow band (NB)-IoT devices, sensors, as well as other wireless communication devices.

The description of embodiments of the disclosure focuses primarily on 3GPP communication standards, but the subject matter of the disclosure may also be applicable to other communication systems with a similar technical background with minor changes without significantly departing from the scope of the disclosure, and this may be so performed by the determination of those skilled in the art to which the disclosure pertains.

In 5G or NR systems, the access and mobility management function (AMF) which is a manager entity for managing the mobility of the UE and the session management function (SMF) which is an entity for managing the session are separated. Accordingly, unlike in the fourth generation (4G) LTE communication system, where the mobility management entity (MME) performs both mobility management and session management, in the 5G or NR system, an entity performing mobility management and an entity performing session management are separated as the AMF and the SMF, respectively, so that the communication method and communication management method between the UE and the network entity have been changed.

For non 3GPP access in the 5G or NR system, mobility management and session management, respectively, may be performed through the AMF and the SMF, via the non-3GPP inter-working function (N3IWF). Further, security-related information which is a critical factor in mobility management may be processed through the AMF.

When the UE uses satellite communication in the mobility context, since the satellite covers various coverages depending on its type unlike general 5G NR cells (or small cells), a method for processing UE registration for UE mobility is required.

In 5G cells or LTE cells, the area covered by the 5G NR or LTE base station may be limited. Accordingly, the AMF or MME may be aware of the location of the UE by the 5G NR base station or LTE base station, and when the UE performs a registration request, it may know the last visited tracking area (TA) of the UE. However, as 5G adopts satellites as a kind of base stations, the cell coverage may reach, e.g., to several tens of or several hundreds of kilometers depending on the of the satellite.

Figure 1B:
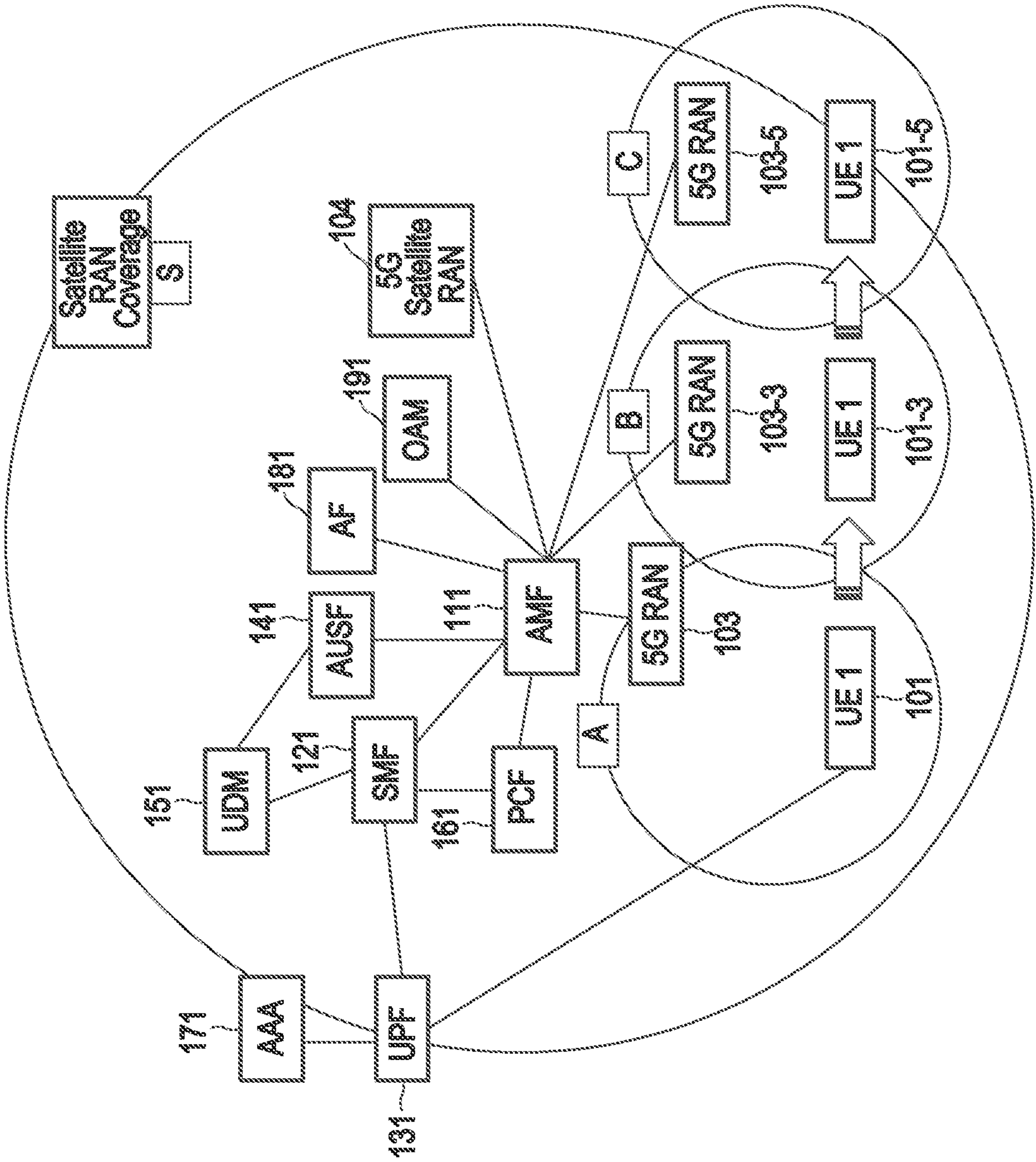
FIG. 1B illustrates a UE and a network environment for performing wireless communication in an environment where 5G communication and satellite communication are supported according to an embodiment of the disclosure.

Referring to FIGS. 1A and 1B, the coverage of the satellite RAN accessed by the UE may reach one country or a larger area including its neighboring country.

As the satellite RAN coverage increases, the location information (e.g., last tracking area identifier (TAI)) of the UE on the move without handover between base stations may not reflect the actual location of the UE. Further, in the situation where each country has different mobile communication operators, it may be impossible to provide a network access service without subscribing to roaming service with a UE which has moved to another country. When the UE performs registration based on the current TA and the previously registered TA, it is required to register the UE so that the base station or AMF is aware of the precise location of the UE. The disclosure proposes a specific procedure for the case where a UE attempts to register through a satellite RAN.

The disclosure proposes a method for processing UE registration for mobility of the UE as the satellite coverage varies depending on the type of the satellite unlike conventional 5G NR cells when the satellite communication is used in the situation where the UE moves. The disclosure proposes a method and device for managing the mobility of the UE using the NAS when the satellite RAN and cellular network are used in 5G mobile communication.

Meanwhile, a false mobility management parameter may be transferred from the AMF to the UE. By the false information, the UE may transition the state, or the UE may cause a malfunction without performing mobility management.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an integrated circuit (IC), or the like.

The disclosure proposes a method regarding 1) when the UE moves within the satellite coverage range (FIG. 1A) and 2) when the UE moves between 5G RANs (FIG. 1B) in an environment where a 5G cellular network and a satellite communication RAN coexist.

FIGS. 1A and 1B illustrate a UE and a network environment for performing wireless communication in an environment where 5G communication and satellite communication are supported according to various embodiments of the disclosure.

Referring to FIGS. 1A and 1B, a 5G or NR core network may include network functions (NFs) such as a user plane function (UPF) 131, a session management function (SMF) 121, an access and mobility management function (AMF) 111, a 5G radio access network (RAN) 103, a 5G satellite RAN 104, a user data management (UDM) 151, a policy control function (PCF) 161, an application function (AF) 181, and an operations, administration and maintenance (OAM) 191. For authenticating the entities, in the 5G or NR core network, entities such as the authentication server function (AUSF) 141 and the authentication, authorization, and accounting (AAA) 171 may be included in the 5G or NR core network.

The AMF 111 is an entity for managing access and mobility of the UE 101. The AMF 111 may perform such functions as registration of the UE 101, connection, reachability, mobility management, access identification/authentication, and mobility event generation.

The SMF 121 may perform a management function for a protocol data unit (PDU) session of the UE 101. The SMF 121 may perform such network functions as session management functions of establishing, modifying, or releasing a session and maintaining a tunnel between the UPF 131 and the RAN 103 necessary therefor, the functions of allocating and managing an Internet protocol (IP) address of the UE 101, selection and control of the user plane, control of traffic processing on the UPF 131, and billing data gathering control.

The UPF 131 serves to process data of the UE 101 and may play a role to transfer the data transmitted from the UE 101 to an external network or process the data to allow the data introduced from the external network to be transferred to the UE 101. The UPF 131 may perform network functions, such as acting as an anchor between radio access technologies (RATs), packet routing and forwarding, packet inspection, application of user plane policy, creating a traffic usage report, or buffering.

The UDM 151 performs functions, such as generating authentication information for 3GPP security, processing the user ID, managing a list of network functions (NFs) supporting the UE 101, and managing subscription information.

The PCF 161 is an NF that manages operator policy information for providing a service in the 5G system.

The UE (user equipment or terminal) 101 may access the 5G core network through the 5G base station 103. Meanwhile, an N3 interworking function (N3IWF) may be present for the UE 101 to communicate through non 3GPP access. When communication is performed through non 3GPP access, the session management is controlled by the UE 101, non 3GPP access, N3IWF, and SMF 121, and mobility management of non 3GPP access is controlled by the UE 101, non 3GPP access, N3IWF, and AMF 111.

As described above, in the 4G LTE system, the MME is in charge of mobility management and session management. In the 5G system, the entities for performing mobility management and session management are separated into the AMF 111 and the SMF 121, respectively. Meanwhile, the 5G system is considering a standalone (SA) deployment structure that communicates only with 5G entities and a non-standalone (SA) deployment structure that uses 4G entities and 5G entities together.

Referring to FIGS. 1A and 1B, such a deployment may be possible where when the UE 101 communicates with the network, the control of the UE 101 is performed by the base stations 103 and 104, and the 5G network entity of the core network is used. The mobility management between the UE 101 and the AMF 111 and the session management between the UE 101 and the SMF 121 may be performed on a non-access stratum (NAS) layer which is called layer 3.

In the disclosure, the UE 101 addresses the following issues in an environment where a 5G cellular network and a satellite communication RAN coexist.

Case 1) In the case of FIG. 1A, the UE 101 moves within the satellite coverage range (101→101-3) toward RAN 103-3. For example, in this case, the network transfers wrong mobility management timer parameters to the UE. Specifically, the network transfers a 54-minute mobility timer which is used in the cellular system to the UE, instead of a 3-hour mobility timer which is used in the satellite RAN environment although the UE is still in the satellite coverage. In this case, although staying in the satellite coverage, the UE may make a UE state transition to the idle state while moving or be deregistered, causing communication discontinuity.

Case 2) In the case of FIG. 1B, the UE moves between 5G RANs 103, 103-3, 103-5 (101→101-3→101-5). In this case, the network transfers wrong mobility management timer or other parameters to the UE. Specifically, in this case, instead of a 54-minute mobility timer which is the mobility management timer value used in the 5G RAN, a 3-hour mobility management timer value which is used in the satellite environment is transferred. In this case, as 54 minutes elapse, the UE fails to send a registration request, so that mobility management may not be properly performed.

The communication network on which the disclosure is based assumes a 5G NR or 4G LTE network. However, the technical spirit of the disclosure may also be applied to other systems within the category which may be understood by one of ordinary skill in the art.

Figure 2:
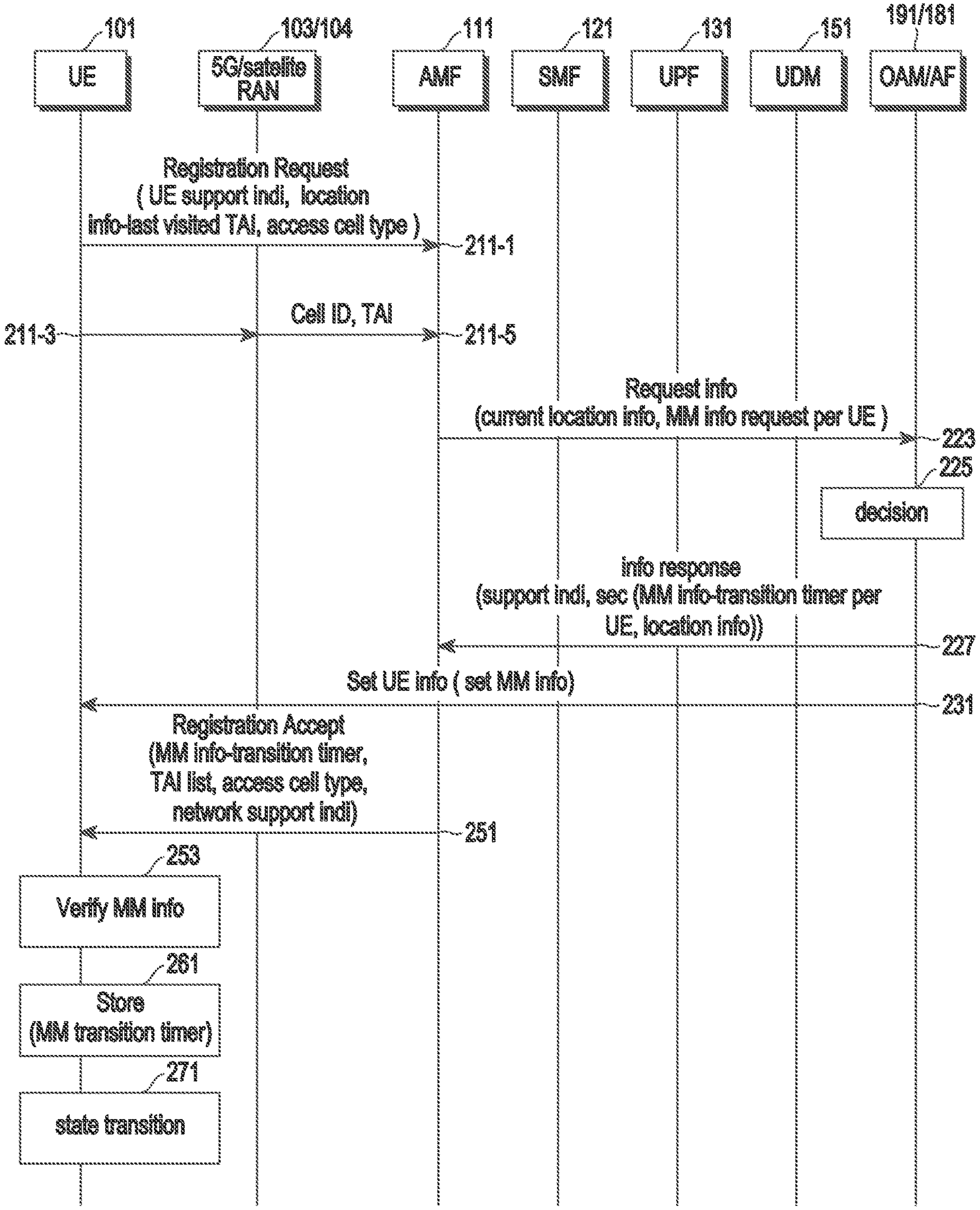
FIG. 2 is a flowchart illustrating a procedure for performing communication using a non-access stratum (NAS) message in an environment where 5G communication and satellite communication are supported according to an embodiment of the disclosure.

FIG. 2 is a view illustrating a procedure for performing communication using a NAS message in an environment where 5G communication and satellite communication are supported according to an embodiment of the disclosure.

Referring to FIG. 2, a wireless communication system may include a UE 101, a 5G RAN 103, a satellite RAN 104, an AMF 111, an SMF 121, a UPF 131, a UDM 151, an OAM 191, and an AF 181.

Referring to FIG. 2, the UE 101 may transmit/receive a registration request message and a registration accept message to/from the AMF 111. In the registration process of FIG. 2, the network may determine and provide a value of a timer to be used by the UE 101.

In processor 211-1, the UE 101 may transmit a registration request message to the AMF 111.

The information contained in the registration request message may be included in the form of an information element (IE) or a parameter. The registration request message transmitted by the UE 101 to the AMF 111 may include at least one of 1) a UE support indication, 2) UE access cell type information, and 3) location information.

1) The UE support information may indicate that the UE 101 supports the satellite mobility management timer (e.g., timer T35xx) or supports the 5G mobility management timer (e.g., timer T35yy) or has the capability of supporting both the timers (e.g., timer T35xx and T35yy).

2) The UE access cell type information is information about the type of the access cell accessed by the UE 101. For example, the information may be information about whether the access cell accessed by the UE 101 is the 5G RAN 103 or the satellite RAN 104.

3) The location information may be information as follows. According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

The registration request message may be transmitted at each predetermined period or when the UE 101 is determined to have moved. The registration request message may be transmitted through an NG-AP section via the RRC message section. There may be information included in the NG-AP message received by the AMF 111 in the NG-AP section and information included in the registration request NAS message received by the AMF 111 in the NAS message.

Process 211-3 is an RRC message section carrying the registration request message of process 211-1. The registration request message which is the NAS message of process 211-1 may be piggybacked in the corresponding messages in the RRC message section of process 211-3 and the NG-AP message section of process 211-5 or may be included and transmitted in the corresponding message.

In process 211-5, the RAN 103/104 may transmit cell ID and TAI information to the AMF 111. Here, the RAN 103/104 may be the satellite RAN 104 or the 5G-RAN 103.

In process 223, the AMF 111 may transmit a request info message for requesting information to the OAM 191 or the AF 181. The request info message may transmit at least one of current location information and a message requesting per-UE mobility management information.

In process 225, the OAM 191 or the AF 181 may determine whether to update and transmit per-UE mobility management information.

In process 227, the OAM 191 or the AF 181 may transmit an info response message to the AMF 111. The info response message may security-protect and include at least one of the support indication indicating whether the OAM 191 or AF 181 supports the function of updating, e.g., the mobility management parameters of the UE 101, mobility management information (e.g., per-UE mobility management timer information), and location information. According to an embodiment, the security protection may be integrity protection. According to an embodiment, the security protection may be encryption protection. According to an embodiment, in the case of encryption, there may be a security key capable of authenticating the OAM 191/AF 181 and the AMF 111 therebetween.

In process 231, the OAM 191 or the AF 181 may transmit mobility management information (e.g., mobility management timer information) of the UE 101 to the UE 101. According to an embodiment, process 231 may or may not be performed.

In process 251, the AMF 111 may transmit a registration accept message to the UE 101. According to an embodiment, the AMF 111 may transmit a registration reject message to the UE 101.

According to an embodiment, each of the registration accept message and the registration reject message may include at least one of mobility management information (e.g., timer information), access cell type information, a network support indication indicating whether the network supports the corresponding function, or location information about the UE.

According to an embodiment, the mobility management information may include a mobility management timer.

The AMF 111 may compare the cell-ID information received through the NG-AP with the cell ID and the access cell type received through the registration request to determine whether the access RAN is the satellite RAN 104 or the 5G RAN 103, and securely transmit a corresponding timer value (timer T35xx, Timer T35yy, or a combination of Timer T35xx and timer T35yy) according to the access network to the UE 101.

Case 1-1) If the access RAN (or access RAN type) is the satellite RAN, a timer value of T35xx (e.g., 3 hours) is transmitted.

Case 1-2) If the type of the access RAN is the cellular RAN (gNB of the general 5G RAN), a timer value of T35yy (e.g., 54 minutes) is transmitted.

Case 1-3) Regardless of the access RAN, the AMF 111, i.e., the network, may securely transfer Timer T35yy, T35xx, or a combination of Timer T35xx and timer T35yy to the UE 101, and set priority to any one of the two combinations according to the access RAN type and transmit it. In other words, Timer T35xx and T35yy may be transferred to the UE 101, or the UE 101 may select a timer value according to given priority or priority determined by the UE 101 and use the same for state transition or message transmission.

The access cell type information is information about whether the RAN accessed by the UE 101 in the network is the satellite RAN 104 or the cellular RAN 103.

The network support indication information may include at least one of 1) whether the network supports to identify the satellite RAN or the cellular RAN to transmit the timer value, 2) whether to be able to transmit multiple timers together depending on whether the satellite RAN or the cellular RAN, 3) information that may indicate whether the network has the capability of giving priority to the network capable of identifying the satellite RAN or 5G RAN accessed by the UE and accessing it, and 4) information of giving priority to the network capable of identifying the satellite RAN or 5G RAN accessed by the UE and accessing it.

The location information capable of access and registration by the UE 101 may be transmitted from the AMF 111 to the UE 101. According to an embodiment, the location information capable of access and registration by the UE 101 may be transmitted to the UE 101 through a registration accept message or a registration reject message.

According to an embodiment, the AMF 111 may transmit, to the UE 101, at least one of the location information (e.g., at least one of the MCC, MNC, or TAC) about the UE 101, current location information, or location information recommended for access or registration. The location information transmitted to the UE 101 may include location information allowed to the UE 101 and based on the subscription information about the UE 101 (e.g., TA or TA list information allowed to the UE 101 for registration), location information recommended to the UE 101 for access (e.g., recommended TA or TA list information recommended to the UE 101 for registration or access), and location information based on the current location information about the UE 101 (e.g., the TA or TA list information based on the current location of the UE 101). The location information may be TA-based location information.

The location information transmitted to the UE 101 through the registration accept message or the registration reject message may be included in the form of an information element (IE) or parameter, and examples of the information are as follows.

For example, the location information may be location information that is included in the registration accept or registration reject message received by the UE 101 in the previous registration request and is based on the location information stored by the UE 101. Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

In process 253, the UE 101 receiving the corresponding information may verify the information. This process may be used to verify the mobility management information received by the UE 101 when mobility management-related information is received in two routes as in process 231 and process 253. According to an embodiment, process 253 may be performed or may not be performed.

In process 261, the UE 101 may store the mobility management transition timer information.

According to an embodiment, the UE 101 may receive the received timer value and, if multiple timers are received, determine a transition timer to be used among the received transition timers according to the access type.

According to an embodiment, the UE 101 may receive the received timer value and, if multiple timers are received, determine a transition timer to be used among the received transition timers according to the access type.

According to an embodiment, the UE 101 may perform a state transition, maintain the current state, or perform registration using the timer (a timer received or a timer received and then determined to be used) later.

According to an embodiment, when the UE 101 is able to receive both the two timers from the network, the UE 101 may determine whether to use timer X (satellite RAN timer, e.g., T35xx) or timer Y (5G RAN timer, e.g., T35yy) according to the access RAN type.

According to an embodiment, the UE 101 may determine whether to use timer X (satellite RAN timer, e.g., T35xx) or timer Y (5G RAN timer, e.g., T35yy) according to the access RAN type determined to have been accessed by the UE 101.

According to an embodiment, the UE 101 may determine whether to user timer X (satellite RAN timer, e.g., T35xx) or timer Y (5G RAN timer, e.g., T35yy) according to the received access RAN type and/or priority.

According to an embodiment, the UE 101 may determine whether to use timer X (satellite RAN timer, e.g., T35xx) or timer Y (5G RAN timer, e.g., T35yy) according to the access RAN type and/or priority determined on its own.

In process 271, the UE 101 may perform a state transition. According to an embodiment, the UE 101 may perform a state transition, maintain the current state, or perform registration using the timer (a timer received or a timer received and then determined to be used).

Figure 3:
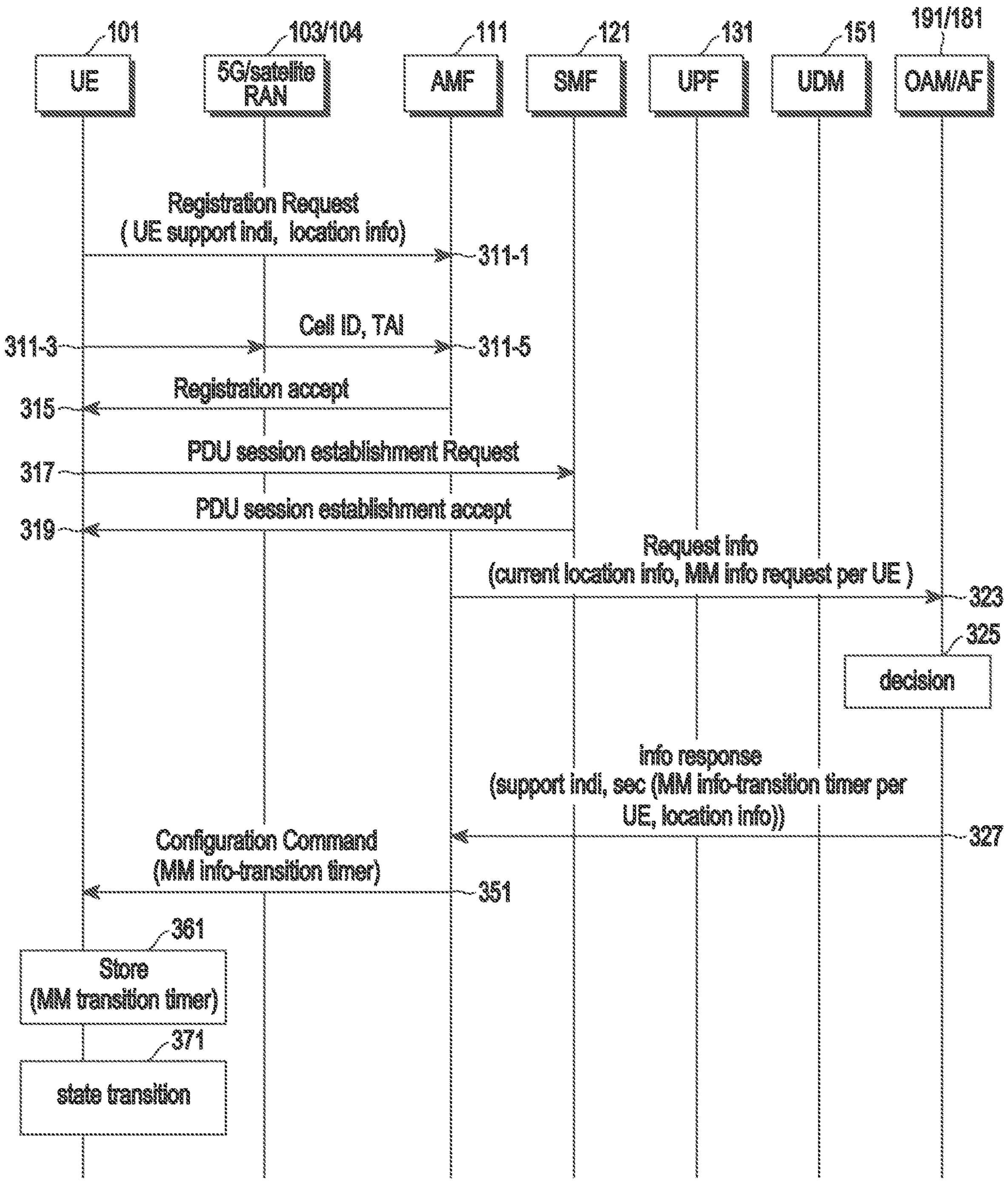
FIG. 3 is a flowchart illustrating a procedure for performing communication using a NAS message in an environment where 5G communication and satellite communication are supported according to an embodiment of the disclosure.

FIG. 3 is a view illustrating a procedure for performing communication using a NAS message in an environment where 5G communication and satellite communication are supported according to an embodiment of the disclosure.

Referring to FIG. 3, a wireless communication system may include a UE 101, a 5G RAN 103, a satellite RAN 104, an AMF 111, an SMF 121, a UPF 131, a UDM 151, an OAM 191, and an AF 181.

Referring to FIG. 3, the UE 101 may receive a configuration command message from the AMF 111. In the configuration process of FIG. 3, the network may determine and provide the value of the timer to be used by the UE 101.

In process 311-1, the UE 101 may transmit a registration request message to the AMF 111. According to an embodiment, the registration request message transmitted by the UE 101 to the AMF 111 may include at least one of 1) UE support indication, 2) UE access cell type information, and 3) location information. The information included by the UE 101 in the registration request message may be included in the form of an information element (IE) or a parameter, and a specific description of the information is given below.

1) The UE support information may indicate that the UE 101 supports the satellite mobility management timer (e.g., timer T35xx) or supports the 5G mobility management timer (e.g., timer T35yy) or has the capability of supporting both the timers (e.g., timer T35xx and T35yy).

2) The UE access cell type information is information about the type of the access cell accessed by the UE 101. Examples of the information may include information about whether it is 5G RAN or satellite RAN.

3) The location information may be information as follows.

According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

The registration request message may be transmitted at each predetermined period or when the UE 101 is determined to have moved. The registration request message may be transmitted through an NG-AP section via the RRC message section. There may be information included in the NG-AP message received by the AMF 111 in the NG-AP section and information included in the registration request NAS message received by the AMF 111 in the NAS message.

Process 311-3 is an RRC message section carrying the registration request message of process 311-1. The registration request message which is the NAS message of process 311-1 may be piggybacked in the corresponding messages in the RRC message section of process 311-3 and the NG-AP message section of process 311-5 or may be included and transmitted in the corresponding message.

In process 311-5, the RAN 103/104 may transmit cell ID and TAI information to the AMF 111. Here, the RAN 103/104 may be the satellite RAN 104 or the 5G-RAN 103.

In process 315, the AMF 111 may transmit a registration accept message to the UE 101. According to an embodiment, the AMF 111 may transmit a registration reject message to the UE 101.

The registration accept message or the registration reject message may include at least one of mobility management information (e.g., timer information), access cell type information, a network support indication indicating whether the network supports the corresponding function, or location information about the UE.

The mobility management information may include information about the mobility management timer.

The AMF 111 may compare the cell-ID information received through the NG-AP with the cell ID and the access cell type received through the registration request to determine whether the access RAN is the satellite RAN or the 5G RAN, and securely transmit a corresponding timer value (timer T35xx, Timer T35yy, or a combination of Timer T35xx and timer T35yy) according to the access network to the UE 101.

Case 1) If the access RAN (or access RAN type) is the satellite RAN, a timer value of T35xx (e.g., 3 hours) is transmitted.

Case 2) If the type of the access RAN is the cellular RAN (gNB of the general 5G RAN), a timer value of T35yy (e.g., 54 minutes) is transmitted.

Case 3) Regardless of the access RAN, the AMF 111, i.e., the network, may securely transfer Timer T35yy, T35xx, or a combination of Timer T35xx and timer T35yy to the UE 101, and set priority to the two combinations according to the access RAN type and transmit it.

Timer T35xx and T35yy may be transferred to the UE 101, or the UE 101 may select a timer value according to given priority or priority determined by the UE 101 and use the same for state transition or message transmission.

The access cell type information may include information about whether the RAN accessed by the UE 101 in the network is the satellite RAN or the cellular RAN.

The network support indication information may include at least one of 1) whether the network supports to identify the satellite RAN or the cellular RAN to transmit the timer value, 2) whether to be able to transmit multiple timers together depending on whether the satellite RAN or the cellular RAN, 3) information that may indicate whether the network has the capability of giving priority to the network capable of identifying the satellite RAN or 5G RAN accessed by the UE and accessing it, and 4) information of giving priority to the network capable of identifying the satellite RAN or 5G RAN accessed by the UE and accessing it.

According to an embodiment, the location information capable of access and registration by the UE 101 may be transmitted from the AMF 111 to the UE 101. According to an embodiment, the location information capable of access and registration by the UE 101 may be transmitted to the UE 101 through a registration accept message or a registration reject message.

At least one of the location information (e.g., at least one of the MCC, MNC, or TAC) about the UE 101, current location information, or location information recommended for access or registration may be transmitted to the UE 101. The location information transmitted to the UE 101 may include location information allowed to the UE 101 and based on the subscription information about the UE 101 (e.g., TA or TA list information allowed to the UE 101 for registration), location information recommended to the UE 101 for access (e.g., recommended TA or TA list information recommended to the UE 101 for registration or access), and location information based on the current location information about the UE 101 (e.g., the TA or TA list information based on the current location of the UE 101). The location information may be TA-based location information.

According to an embodiment, the location information transmitted to the UE 101 through the registration accept message or the registration reject message may be included in the form of an information element (IE) or parameter.

According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

In process 317, the UE 101 may transmit a PDU session establishment request message to the SMF 121.

In process 319, the UE 101 may receive a PDU session establishment accept message from the SMF 121.

In process 323, the AMF 111 may transmit a request info message for requesting information to the OAM 191 or the AF 181. The request info message may include at least one of current location information and per-UE mobility management information.

In process 325, the OAM 191 or the AF 181 may determine whether to update and transmit per-UE mobility management information.

In process 327, the OAM 191 or the AF 181 may transmit an info response message to the AMF 111. The info response message may security-protect and include at least one of the support indication indicating whether the OAM 191 or AF 181 supports the function of updating, e.g., the mobility management parameters of the UE 101, mobility management information (e.g., per-UE mobility management timer information), and location information.

According to an embodiment, the security protection may be integrity protection.

According to an embodiment, the security protection may be encryption protection. According to an embodiment, in the case of encryption, there may be a security key capable of authenticating the OAM 191/AF 181 and the AMF 111 therebetween.

In process 351, the AMF 111 may transmit a configuration command message to the UE 101.

According to an embodiment, the configuration command message may include at least one of mobility management information (e.g., timer information), access cell type information, a network support indication indicating whether the network supports the corresponding function, or location information about the UE.

The mobility management information may include information about the mobility management timer.

The AMF 111 may compare the cell-ID information received through the NG-AP with the cell ID and the access cell type received through the registration request to determine whether the access RAN is the satellite RAN or the 5G RAN, and securely transmit a corresponding timer value (timer T35xx, Timer T35yy, or a combination of Timer T35xx and timer T35yy) according to the access network to the UE 101.

Case 1) If the access RAN (or access RAN type) is the satellite RAN, a timer value of T35xx (e.g., 3 hours) is transmitted.

Case 2) If the type of the access RAN is the cellular RAN (gNB of the general 5G RAN), a timer value of T35yy (e.g., 54 minutes) is transmitted.

Case 1-3) Regardless of the access RAN, the AMF 111, i.e., the network, may securely transfer Timer T35yy, T35xx, or a combination of Timer T35xx and timer T35yy to the UE 101, and give priority to any one of the two combinations according to the access RAN type and transmit it. According to an embodiment, Timer T35xx and T35yy may be transferred to the UE, or the UE may select a timer value according to given priority or priority determined by the UE 101 and use the same for state transition or message transmission.

The access cell type information may include information about whether the RAN accessed by the UE 101 in the network is the satellite RAN or the cellular RAN.

The network support indication information may include at least one of 1) whether the network supports to identify the satellite RAN or the cellular RAN to transmit the timer value, 2) whether to be able to transmit multiple timers together depending on whether the satellite RAN or the cellular RAN, 3) information that may indicate whether the network has the capability of giving priority to the network capable of identifying the satellite RAN or 5G RAN accessed by the UE and accessing it, and 4) information of giving priority to the network capable of identifying the satellite RAN or 5G RAN accessed by the UE and accessing it.

The location information capable of access and registration by the UE 101 may be transmitted from the AMF 111 to the UE 101. According to an embodiment, the location information capable of access and registration by the UE 101 may be transmitted to the UE 101 through a registration accept message or a registration reject message.

At least one of the location information (e.g., at least one of the MCC, MNC, or TAC) about the UE 101, current location information, or location information recommended for access or registration may be transmitted to the UE 101. The location information transmitted to the UE 101 may include location information allowed to the UE 101 and based on the subscription information about the UE 101 (e.g., TA or TA list information allowed to the UE 101 for registration), location information recommended to the UE 101 for access (e.g., recommended TA or TA list information recommended to the UE 101 for registration or access), and location information based on the current location information about the UE 101 (e.g., the TA or TA list information based on the current location of the UE 101). The location information may be TA-based location information.

According to an embodiment, the location information transmitted to the UE 101 through the registration accept message or the registration reject message may be included in the form of an information element (IE) or parameter.

According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

In process 361, the UE 101 may store the mobility management transition timer information.

According to an embodiment, the UE 101 may receive the received timer value and, if multiple timers are received, determine a transition timer to be used among the received transition timers according to the access type.

According to an embodiment, the UE 101 may receive the received timer value and, if multiple timers are received, determine a transition timer to be used among the received transition timers according to the access type.

According to an embodiment, the UE 101 may perform a state transition, maintain the current state, or perform registration using the timer (a timer received or a timer received and then determined to be used) later.

According to an embodiment, when the UE 101 is able to receive both the two timers from the network, the UE 101 may determine whether to use timer X (satellite RAN timer, e.g., T35xx) or timer Y (5G RAN timer, e.g., T35yy) according to the access RAN type and use the determined timer.

According to an embodiment, the UE 101 may determine whether to use timer X (satellite RAN timer, e.g., T35xx) or timer Y (5G RAN timer, e.g., T35yy) according to the access RAN type determined to have been accessed by the UE 101 and use the determined timer.

According to an embodiment, the UE 101 may determine whether to user timer X (satellite RAN timer, e.g., T35xx) or timer Y (5G RAN timer, e.g., T35yy) according to the received access RAN type and priority and use the determined timer.

According to an embodiment, the UE 101 may determine whether to use timer X (satellite RAN timer, e.g., T35xx) or timer Y (5G RAN timer, e.g., T35yy) according to the access RAN type and priority determined on its own and use the determined timer.

In process 371, the UE 101 may perform a state transition. According to an embodiment, the UE 101 may perform a state transition, maintain the current state, or perform registration using the timer (a timer received or a timer received and then determined to be used).

Figure 4:
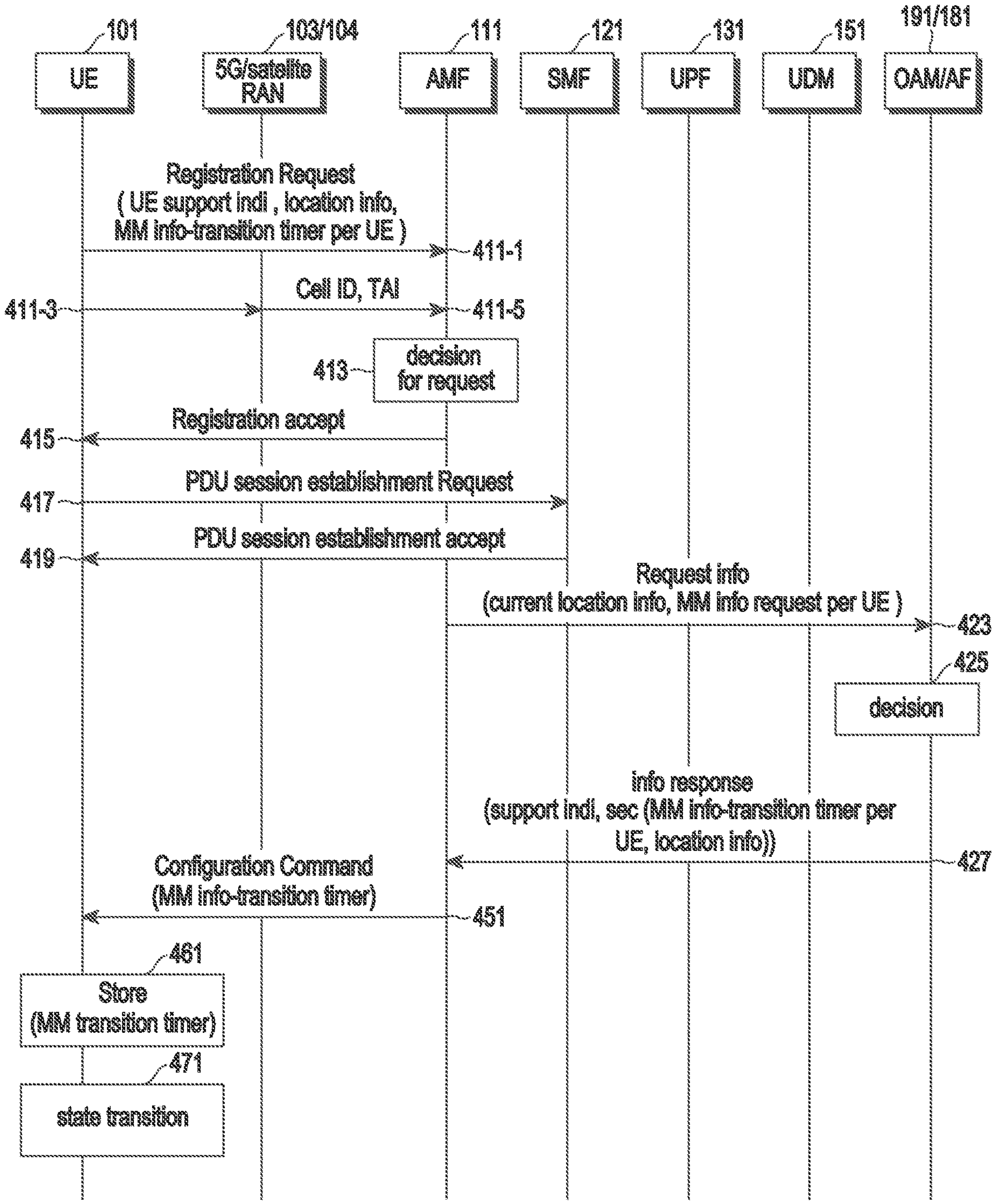
FIG. 4 is a flowchart illustrating a procedure for performing communication using a NAS message in an environment where 5G communication and satellite communication are supported according to an embodiment of the disclosure.

FIG. 4 is a view illustrating a procedure for performing communication using a NAS message in an environment where 5G communication and satellite communication are supported according to an embodiment of the disclosure.

Referring to FIG. 4, a wireless communication system may include a UE 101, a 5G RAN 103, a satellite RAN 104, an AMF 111, an SMF 121, a UPF 131, a UDM 151, an OAM 191, and an AF 181.

In the registration request process of FIG. 4, the UE 101 may inform the network of the value for the transition timer that may be supported by the UE 101. Thereafter, as the network determines the value of the timer to be used by the UE 101 and informs the UE 101 of the value through a configuration command, the configuration may be updated by the network.

In process 411-1, the UE 101 may transmit a registration request message to the AMF 111.

The registration request message transmitted by the UE 101 to the AMF 111 may include at least one of 1) UE support indication, 2) access cell type information, and 3) location information. The information included by the UE 101 in the registration request message may be included in the form of an information element (IE) or a parameter. In process 411, the UE 101 may transmit the value of the per-UE mobility management transition timer. The value may be a value previously received and stored by the UE 101 and set and transmitted.

1) The UE support information may indicate that the UE supports the satellite mobility management timer (e.g., timer T35xx) or supports the 5G mobility management timer (e.g., timer T35yy) or has the capability of supporting both the timers (e.g., timer T35xx and T35yy).

2) The UE access cell type information may include information about the type of the access cell accessed by the UE 101. The UE access cell type information may include information about whether it is 5G RAN or satellite RAN.

The location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

The registration request message may be transmitted at each predetermined period or when the UE 101 is determined to have moved. The registration request message may be transmitted through an NG-AP section via the RRC message section. There may be information included in the NG-AP message received by the AMF 111 in the NG-AP section and information included in the registration request NAS message received by the AMF 111 in the NAS message.

Process 411-3 is an RRC message section carrying the registration request message of process 411-1. The registration request message which is the NAS message of process 411-1 may be piggybacked in the corresponding messages in the RRC message section of process 411-3 and the NG-AP message section of process 411-5 or may be included and transmitted in the corresponding message.

In process 411-5, the RAN 103/104 may transmit cell ID and TAI information to the AMF 111. Here, the RAN 103/104 may be the satellite RAN 104 or the 5G-RAN 103.

In process 413, the AMF 111 may verify the mobility management-related information (e.g., mobility management timer) sent by the UE 101 and determine whether to send a request for mobility management-related information to the AF 181 or the OAM 191.

In process 415, the AMF 111 may transmit a registration accept message to the UE 101. According to an embodiment, the AMF 111 may transmit a registration reject message to the UE 101.

According to an embodiment, the registration accept message or the registration reject message may include at least one of mobility management information (e.g., timer information), access cell type information, a network support indication indicating whether the network supports the corresponding function, or location information about the UE.

The mobility management information may include information about the mobility management timer.

According to an embodiment, the AMF 111 may compare the cell-ID information received through the NG-AP with the cell ID and the access cell type received through the registration request to determine whether the access RAN is the satellite RAN or the 5G RAN, and securely transmit a corresponding timer value (timer T35xx, Timer T35yy, or a combination of Timer T35xx and timer T35yy) according to the access network to the UE 101.

Case 1) If the access RAN (or access RAN type) is the satellite RAN, a timer value of T35xx (e.g., 3 hours) is transmitted.

Case 2) If the type of the access RAN is the cellular RAN (gNB of the general 5G RAN), a timer value of T35yy (e.g., 54 minutes) is transmitted.

Case 3) Regardless of the access RAN, the AMF 111, i.e., the network, may securely transfer Timer T35yy, T35xx, or a combination of Timer T35xx and timer T35yy to the UE 101, and set priority to any one of the two combinations according to the access RAN type and transmit it.

According to an embodiment, Timer T35xx and T35yy may be transferred to the UE 101, or the UE 101 may select a timer value according to given priority or priority determined by the UE 101 and use the same for state transition or message transmission.

The access cell type information may include information about whether the RAN accessed by the UE 101 in the network is the satellite RAN or the cellular RAN.

The network support indication information may include at least one of 1) whether the network supports to identify the satellite RAN or the cellular RAN to transmit the timer value, 2) whether to be able to transmit multiple timers together depending on whether the satellite RAN or the cellular RAN, 3) information that may indicate whether the network has the capability of giving priority to the network capable of identifying the satellite RAN or 5G RAN accessed by the UE and accessing it, and 4) information of giving priority to the network capable of identifying the satellite RAN or 5G RAN accessed by the UE and accessing it.

The location information capable of access and registration by the UE 101 may be transmitted from the AMF 111 to the UE 101. According to an embodiment, the location information capable of access and registration by the UE 101 may be transmitted to the UE 101 through a registration accept message or a registration reject message.

At least one of the location information (e.g., at least one of the MCC, MNC, or TAC) about the UE 101, current location information, or location information recommended for access or registration may be transmitted to the UE 101. The location information transmitted to the UE 101 may include location information allowed to the UE 101 and based on the subscription information about the UE 101 (e.g., TA or TA list information allowed to the UE 101 for registration), location information recommended to the UE 101 for access (e.g., recommended TA or TA list information recommended to the UE 101 for registration or access), and location information based on the current location information about the UE 101 (e.g., the TA or TA list information based on the current location of the UE 101). The location information may be TA-based location information.

According to an embodiment, the location information transmitted to the UE 101 through the registration accept message or the registration reject message may be included in the form of an information element (IE) or parameter.

According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101-last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

In process 417, the UE 101 may transmit a PDU session establishment request message to the SMF 121.

In process 419, the UE 101 may receive a PDU session establishment accept message from the SMF 121.

In process 423, the AMF 111 may transmit a request info message for requesting information to the OAM 191 or the AF 181. The request info message may include current location information and per-UE mobility management information. In process 425, the OAM 191 or the AF 181 may determine whether to update and transmit per-UE mobility management information.

In process 427, the OAM 191 or the AF 181 may transmit an info response message to the AMF 111. The info response message may security-protect and include at least one of the support indication indicating whether the OAM 191 or AF 181 supports the function of updating, e.g., the mobility management parameters of the UE 101, mobility management information (e.g., per-UE mobility management timer information), and location information.

According to an embodiment, the security protection may be integrity protection.

According to an embodiment, the security protection may be encryption protection. According to an embodiment, in the case of encryption, there may be a security key capable of authenticating the OAM 191/AF 181 and the AMF 111 therebetween.

In process 451, the AMF 111 may transmit a configuration command message to the UE 101.

According to an embodiment, the configuration command message may include at least one of mobility management information (e.g., timer information), access cell type information, a network support indication indicating whether the network supports the corresponding function, or location information about the UE.

The mobility management information may include information about the mobility management timer.

The AMF 111 may compare the cell-ID information received through the NG-AP with the cell ID and the access cell type received through the registration request to determine whether the access RAN is the satellite RAN or the 5G RAN, and securely transmit a corresponding timer value (timer T35xx, Timer T35yy, or a combination of Timer T35xx and timer T35yy) according to the access network to the UE.

Case 1) If the access RAN (or access RAN type) is the satellite RAN, a timer value of T35xx (e.g., 3 hours) is transmitted.

Case 2) If the type of the access RAN is the cellular RAN (gNB of the general 5G RAN), a timer value of T35yy (e.g., 54 minutes) is transmitted.

Case 3) Regardless of the access RAN, the AMF 111, i.e., the network, may securely transfer Timer T35yy, T35xx, or a combination of Timer T35xx and timer T35yy to the UE 101, and set priority to any one of the two combinations according to the access RAN type and transmit it. According to an embodiment, Timer T35xx and T35yy may be transferred to the UE 101, or the UE 101 may select a timer value according to given priority or priority determined by the UE 101 and use the same for state transition or message transmission.

The access cell type information may include information about whether the RAN accessed by the UE 101 in the network is the satellite RAN or the cellular RAN.

The network support indication information may include at least one of 1) whether the network supports to identify the satellite RAN or the cellular RAN to transmit the timer value, 2) whether to be able to transmit multiple timers together depending on whether the satellite RAN or the cellular RAN, 3) information that may indicate whether the network has the capability of giving priority to the network capable of identifying the satellite RAN or 5G RAN accessed by the UE and accessing it, and 4) information of giving priority to the network capable of identifying the satellite RAN or 5G RAN accessed by the UE and accessing it.

The location information capable of access and registration by the UE 101 may be transmitted from the AMF 111 to the UE 101. According to an embodiment, the location information capable of access and registration by the UE 101 may be transmitted to the UE 101 through a registration accept message or a registration reject message.

At least one of the location information (e.g., at least one of the MCC, MNC, or TAC) about the UE 101, current location information, or location information recommended for access or registration may be transmitted to the UE 101. The location information transmitted to the UE 101 may include location information allowed to the UE 101 and based on the subscription information about the UE 101 (e.g., TA or TA list information allowed to the UE 101 for registration), location information recommended to the UE 101 for access (e.g., recommended TA or TA list information recommended to the UE 101 for registration or access), and location information based on the current location information about the UE 101 (e.g., the TA or TA list information based on the current location of the UE 101). The location information may be TA-based location information.

According to an embodiment, the location information transmitted to the UE 101 through the registration accept message or the registration reject message may be included in the form of an information element (IE) or parameter.

According to an embodiment, the location information may be location information that is included in the registration accept or registration reject message received by the UE 101 in the previous registration request and is based on the location information stored by the UE 101.

Examples of the location information may include at least one of the following information.

- Location information (e.g., TA or TA list information allowed to the UE 101 for registration) allowed to the UE 101 based on the subscription information about the UE 101.
- Last visited TAI information.
- Location information (e.g., TA or TA list information based on the current location of the UE 101) based on the current location information about the UE 101. The location information may be TA-based location information.
- Location information where access by the UE 101 is recommended (e.g., recommended TA or TA list information where registration or access is recommended for the UE 101).
- Location information except for information stored in a forbidden list not allowed to the UE 101 for access (e.g., PLMN except for those in the forbidden list, TA or TA list except for those in the forbidden list).
- Location information list (forbidden list) where access or registration of the UE 101 is forbidden (PLMN forbidden for registration, TA or TA list forbidden for registration).

In process 461, the UE 101 may store the mobility management transition timer information.

According to an embodiment, the UE 101 may receive the received timer value and, if multiple timers are received, determine a transition timer to be used among the received transition timers according to the access type.

According to an embodiment, the UE 101 may receive the received timer value and, if multiple timers are received, determine a transition timer to be used among the received transition timers according to the access type.

According to an embodiment, the UE 101 may perform a state transition, maintain the current state, or perform registration using the timer (a timer received or a timer received and then determined to be used) later.

According to an embodiment, when the UE 101 is able to receive both the two timers from the network, the UE 101 may determine whether to use timer X (satellite RAN timer, e.g., T35xx) or timer Y (5G RAN timer, e.g., T35yy) according to the access RAN type and use the determined timer.

According to an embodiment, the UE 101 may determine whether to use timer X (satellite RAN timer, e.g., T35xx) or timer Y (5G RAN timer, e.g., T35yy) according to the access RAN type determined to have been accessed by the UE 101 and use the determined timer.

According to an embodiment, the UE 101 may determine whether to user timer X (satellite RAN timer, e.g., T35xx) or timer Y (5G RAN timer, e.g., T35yy) according to the received access RAN type and priority and use the determined timer.

According to an embodiment, the UE 101 may determine whether to use timer X (satellite RAN timer, e.g., T35xx) or timer Y (5G RAN timer, e.g., T35yy) according to the access RAN type and priority determined on its own and use the determined timer.

In process 471, the UE 101 may perform a state transition. According to an embodiment, the UE 101 may perform a state transition, maintain the current state, or perform registration using the timer (a timer received or a timer received and then determined to be used).

Figure 5:
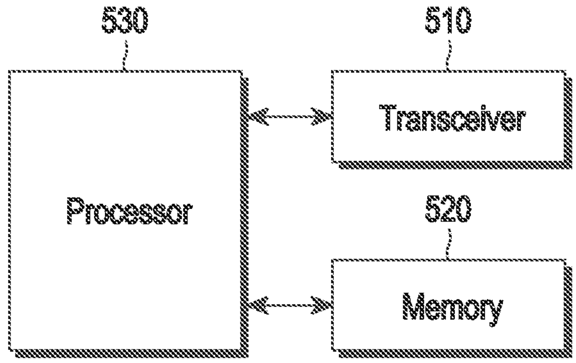
FIG. 5 is a view illustrating a configuration of a UE according to an embodiment of the disclosure.

FIG. 5 is a view illustrating a configuration of a UE according to an embodiment of the disclosure.

Referring to FIG. 5, a UE of the disclosure may include a transceiver 510, memory 520, and a processor 530. The processor 530, transceiver 510, and memory 520 of the UE may be operated according to the above-described UE communication method. However, the components of the UE are not limited thereto. For example, the UE may include more or fewer components than the above-described components. The processor 530, the transceiver 510, and the memory 520 may be implemented in the form of a single chip.

The transceiver 510 collectively refers to the transmitter of the UE and the receiver of the UE and may transmit and receive signals to/from the base station or various network entities. The signals transmitted/received with the base station may include control information and data. To that end, the transceiver 510 may include a radio frequency (RF) transmitter for frequency-up converting and amplifying signals transmitted and an RF receiver for low-noise amplifying signals received and frequency-down converting the frequency of the received signals. However, this is merely an example of the transceiver 510, and the components of the transceiver 510 are not limited to the RF transmitter and the RF receiver. Further, the transceiver 510 may include a wired/wireless transceiver and may include various components for transmitting/receiving signals. The transceiver 510 may receive signals via a radio channel, output the signals to the processor 530, and transmit signals output from the processor 530 via a radio channel. Further, the transceiver 510 may receive the communication signal and output it to the processor and transmit the signal output from the processor to various network entities through the wired/wireless network.

The memory 520 may store programs and data necessary for the operation of the UE. The memory 520 may store control information or data that is included in the signal obtained by the UE. The memory 520 may include a storage medium, such as read only memory (ROM), random access memory (RAM), hard disk, compact disc read only memory (CD-ROM), and digital versatile disc (DVD), or a combination of storage media.

The processor 530 may control a series of processes for the UE to be able to operate according to the above-described embodiments. The processor 530 may include at least one processor. For example, the processor 530 may include a communication processor (CP) that performs control for communication and an application processor (AP) that controls an upper layer, such as an application program.

Figure 6:
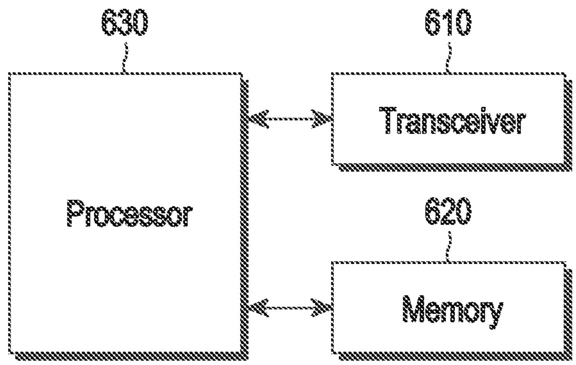
FIG. 6 is a view illustrating a configuration of a network entity according to an embodiment of the disclosure.

FIG. 6 is a block diagram illustrating a configuration of a network entity according to an embodiment of the disclosure.

Referring to FIG. 6, a network entity of the disclosure may include a transceiver 610, memory 620, and a processor 630. The processor 630, transceiver 610, and memory 620 of the network entity may operate according to the above-described communication methods by the network entity. However, the components of the network entity are not limited thereto. For example, the network entity may include more or fewer components than the above-described components. The processor 630, the transceiver 610, and the memory 620 may be implemented in the form of a single chip. The network entity may include network functions (NFs), such as the access and mobility management function (AMF), session management function (SMF), policy control function (PCF), network exposure function (NEF), unified data management (UDM), and user plane function (UPF), as described above. The network entity may include a base station.

The transceiver 610 collectively refers to the receiver of the network entity and the transmitter of the network entity and may transmit and receive signals to/from a UE or another network entity. In this case, the signals transmitted/received with the base station may include control information and data. To that end, the transceiver 610 may include a radio frequency (RF) transmitter for frequency-up converting and amplifying signals transmitted and an RF receiver for low-noise amplifying signals received and frequency-down converting the frequency of the received signals. However, this is merely an example of the transceiver 610, and the components of the transceiver 610 are not limited to the RF transmitter and the RF receiver. The transceiver 610 may include a wired/wireless transceiver and may include various components for transmitting/receiving signals. Further, the transceiver 610 may receive signals via a communication channel (e.g., a radio channel), output the signals to the processor 630, and transmit signals output from the processor 630 via a radio channel. Further, the transceiver 610 may receive the communication signal and output it to the processor and transmit the signal output from the processor to the UE or network entity through the wired/wireless network.

The memory 620 may store programs and data necessary for the operation of the network entity. Further, the memory 620 may store control information or data that is included in the signal obtained by the network entity. The memory 620 may include a storage medium, such as ROM, RAM, hard disk, CD-ROM, and DVD, or a combination of storage media.

The processor 630 may control a series of processes for the network entity to be able to operate according to the above-described embodiments. The processor 630 may include at least one processor. The methods according to the embodiments described in the specification or claims of the disclosure may be implemented in hardware, software, or a combination of hardware and software.

When implemented in software, there may be provided a non-transitory computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) communicating with a satellite radio access network (RAN) and a cellular network, the method comprising:

transmitting, to an access and mobility management function (AMF), a registration request message including information about the UE's supporting capability for each of a first timer for the satellite RAN and a second timer for the cellular network, an access cell type, and location information;

receiving, from the AMF, a registration accept message including supporting information about a network related to the first timer and the second timer and mobility management information; and determining at least one timer to be used by the UE of the first timer and the second timer based on the supporting information about the network and the mobility management information, wherein the location information includes last visited tracking area (TA) identifier (TAI) information, location information where access by the UE is recommended, and location information except for information stored in a forbidden list not allowed to the UE for access, and wherein the supporting information about the network includes information indicating whether the network supports to identify the satellite RAN or the cellular network to transmit a timer value.

2. The method of claim 1, further comprising one of:

transitioning a state of the UE using the at least one timer;

maintaining a current state of the UE using the at least one timer; or performing a registration procedure for the UE using the at least one timer.

3. The method of claim 1, wherein the registration accept message further includes location information capable of access and registration by the UE.

4. A method performed by an access and mobility management function (AMF) communicating with a satellite radio access network (RAN) and a cellular network, the method comprising:

receiving, from a user equipment (UE), a registration request message including information about the UE's supporting capability for each of a first timer for the satellite RAN and a second timer for the cellular network, an access cell type, and location information;

determining whether a network accessed by the UE is the satellite RAN or the cellular network, based on the access cell type and the location information; and transmitting, to the UE, a registration accept message including supporting information about a network related to the first timer and the second timer and mobility management information, based on a result of the determination, wherein the location information includes last visited tracking area (TA) identifier (TAI) information, location information where access by the UE is recommended, and location information except for information stored in a forbidden list not allowed to the UE for access, and wherein the supporting information about the network includes information indicating whether the network supports to identify the satellite RAN or the cellular network to transmit a timer value.

5. The method of claim 4, wherein at least one of the first timer or the second timer is used for transitioning a state of the UE and a registration procedure for the UE.

6. The method of claim 4, wherein the registration accept message further includes location information capable of access and registration by the UE.

7. A user equipment (UE) communicating with a satellite radio access network (RAN) and a cellular network, the UE comprising:

a transceiver;

memory storing one or more computer programs; and one or more processors communicatively coupled to the transceiver and the memory, wherein the one or more computer programs include computer-executable instructions that, when executed by the one or more processors, cause the UE to:

transmit, to an access and mobility management function (AMF), a registration request message including information about the UE's supporting capability for each of a first timer for the satellite RAN and a second timer for the cellular network, an access cell type, and location information, receive, from the AMF, a registration accept message including supporting information about a network related to the first timer and the second timer and mobility management information, and determine at least one timer to be used by the UE of the first timer and the second timer based on the supporting information about the network and the mobility management information, wherein the location information includes last visited tracking area (TA) identifier (TAI) information, location information where access by the UE is recommended, and location information except for information stored in a forbidden list not allowed to the UE for access, and wherein the supporting information about the network includes information indicating whether the network supports to identify the satellite RAN or the cellular network to transmit a timer value.

8. The UE of claim 7, wherein the one or more computer programs further include computer-executable instructions that, when executed by the one or more processors, cause the UE to one of:

transition a state of the UE using the at least one timer, maintain a current state of the UE using the at least one timer, or perform a registration procedure for the UE using the at least one timer.

9. The UE of claim 7, wherein the registration accept message further includes location information capable of access and registration by the UE.

10. An access and mobility management function (AMF) communicating with a satellite radio access network (RAN) and a cellular network, the AMF comprising:

a transceiver;

memory storing one or more computer programs; and one or more processors communicatively coupled to the transceiver and the memory, wherein the one or more computer programs include computer-executable instructions that, when executed by the one or more processors, cause the AMF to:

receive, from a user equipment (UE), a registration request message including information about the UE's supporting capability for each of a first timer for the satellite RAN and a second timer for the cellular network, an access cell type, and location information, determine whether a network accessed by the UE is the satellite RAN or the cellular network, based on the access cell type and the location information, and transmit, to the UE, a registration accept message including supporting information about a network related to the first timer and the second timer and mobility management information, based on a result of the determination, wherein the location information includes last visited tracking area (TA) identifier (TAI) information, location information where access by the UE is recommended, and location information except for information stored in a forbidden list not allowed to the UE for access, and wherein the supporting information about the network includes information indicating whether the network supports to identify the satellite RAN or the cellular network to transmit a timer value.

11. The AMF of claim 10, wherein the registration accept message further includes location information capable of access and registration by the UE.

* * * * *